(12) United States Patent
Pollmann et al.

(10) Patent No.: US 7,577,100 B2
(45) Date of Patent: Aug. 18, 2009

(54) SYSTEM AND METHOD FOR MEASURING SIGNAL TO NOISE VALUES IN AN ADAPTIVE WIRELESS COMMUNICATION SYSTEM

(76) Inventors: Stephen Pollmann, 8531 Tyler St., Santee, CA (US) 92071; Kenneth Stanwood, 935 Rosemary Ave., Carlsbad, CA (US) 92009; David Gazelle, 5215 Fiore Ter., San Diego, CA (US) 92122

( * ) Notice: Subject to any disclaimer, the term of this patent is extended or adjusted under 35 U.S.C. 154(b) by 1158 days.

(21) Appl. No.: 10/207,661

(22) Filed: Jul. 26, 2002

(65) Prior Publication Data

US 2003/0165157 A1    Sep. 4, 2003

Related U.S. Application Data

(60) Provisional application No. 60/308,255, filed on Jul. 27, 2001.

(51) Int. Cl.
*G01R 31/08* (2006.01)
*H04B 7/212* (2006.01)
*H04J 3/16* (2006.01)

(52) U.S. Cl. .................. 370/252; 370/328; 370/465

(58) Field of Classification Search ......... 370/465–468, 370/337, 347, 252, 328, 338; 455/102
See application file for complete search history.

(56) References Cited

U.S. PATENT DOCUMENTS

| | | | |
|---|---|---|---|
| 3,949,404 A | 4/1976 | Fletcher et al. |
| 4,232,197 A | 11/1980 | Acampora et al. |
| 4,495,619 A | 1/1985 | Acampora |
| 4,575,857 A | 3/1986 | Murakami |
| 4,599,732 A | 7/1986 | LeFever |
| 4,775,988 A | 10/1988 | Chevillat et al. |
| 4,849,989 A | 7/1989 | Kamerman |

(Continued)

FOREIGN PATENT DOCUMENTS

EP    0 353 759    2/1990

(Continued)

OTHER PUBLICATIONS

Lin., et al., *"Error Control Coding, Fundamentals and Applications"*, Prentice-Hall Computer Applications in Electrical Engineering Series., 1993, pp. 315-349.

(Continued)

*Primary Examiner*—Kevin C Harper
*Assistant Examiner*—Nittaya Juntima
(74) *Attorney, Agent, or Firm*—Schwabe, Williamson & Wyatt, P.C.

(57) ABSTRACT

The system and method optimizes a SNR calculation for a signal received during a downlink burst even in the absence of a node's preferred modulation. This system and method are used in communication systems that include a multi-modulation modem. An adaptation factor is selected whereby its use during portions of the downlink burst, which were not modulated using the preferred modulation, provides the SNR. The selected adaptation factor is used by an equalizer to perform channel inversion to the signal. The system and method can be used in, for example, an FDD or TDD communication system. Such communication systems can be, for example, symmetric, asymmetric, and/or adaptive in their operation.

28 Claims, 9 Drawing Sheets

U.S. PATENT DOCUMENTS

| | | | |
|---|---|---|---|
| 4,849,996 A | 7/1989 | Kamerman | |
| 5,130,983 A | 7/1992 | Heffner, III | |
| 5,297,144 A | 3/1994 | Gilbert et al. | |
| 5,420,851 A | 5/1995 | Seshadri et al. | |
| 5,444,696 A | 8/1995 | Petranovich | |
| 5,444,698 A | 8/1995 | Kito | |
| 5,479,447 A | 12/1995 | Chow et al. | |
| 5,487,181 A | 1/1996 | Dailey et al. | |
| 5,511,082 A | 4/1996 | How et al. | |
| 5,517,503 A | 5/1996 | Hess | |
| 5,566,210 A | 10/1996 | Saito et al. | |
| 5,577,087 A * | 11/1996 | Furuya | 375/377 |
| 5,592,470 A | 1/1997 | Rudrapatna et al. | |
| 5,615,212 A | 3/1997 | Ruszczyk et al. | |
| 5,638,371 A | 6/1997 | Raychaudhuri et al. | |
| 5,638,374 A | 6/1997 | Heath | |
| 5,640,395 A | 6/1997 | Hamalainen et al. | |
| 5,675,573 A | 10/1997 | Karol et al. | |
| 5,701,294 A * | 12/1997 | Ward et al. | 370/252 |
| 5,710,762 A | 1/1998 | Petranovich | |
| 5,751,708 A | 5/1998 | Eng et al. | |
| 5,764,699 A | 6/1998 | Needham et al. | |
| 5,768,254 A | 6/1998 | Papadopoulos et al. | |
| 5,828,695 A * | 10/1998 | Webb | 375/219 |
| 5,859,619 A | 1/1999 | Wu et al. | |
| 5,890,055 A | 3/1999 | Chu et al. | |
| 5,953,344 A | 9/1999 | Dail et al. | |
| 6,002,713 A | 12/1999 | Goldstein et al. | |
| 6,006,069 A | 12/1999 | Langston | |
| 6,016,311 A | 1/2000 | Gilbert et al. | |
| 6,016,313 A | 1/2000 | Foster, Jr. et al. | |
| 6,031,827 A | 2/2000 | Rikkinen et al. | |
| 6,038,455 A | 3/2000 | Gardner et al. | |
| 6,049,551 A | 4/2000 | Hinderks et al. | |
| 6,075,808 A | 6/2000 | Tsujimoto | |
| 6,094,421 A | 7/2000 | Scott | |
| 6,097,733 A | 8/2000 | Basu et al. | |
| 6,108,374 A | 8/2000 | Balachandran et al. | |
| 6,112,080 A | 8/2000 | Anderson et al. | |
| 6,137,787 A | 10/2000 | Chawla et al. | |
| 6,172,970 B1 * | 1/2001 | Ling et al. | 370/347 |
| 6,249,526 B1 | 6/2001 | Loukianov | |
| 6,263,077 B1 | 7/2001 | Zuranski et al. | |
| 6,301,238 B1 * | 10/2001 | Hagerman et al. | 370/336 |
| 6,330,278 B1 * | 12/2001 | Masters et al. | 375/223 |
| 6,341,214 B2 | 1/2002 | Uesugi | 455/69 |
| 6,400,928 B1 * | 6/2002 | Khullar et al. | 455/67.11 |
| 6,452,964 B1 * | 9/2002 | Yoshida | 375/222 |
| 6,549,759 B2 * | 4/2003 | Arviv et al. | 455/69 |
| 6,636,500 B2 * | 10/2003 | Krishnamoorthy et al. | 370/347 |
| 6,823,005 B1 * | 11/2004 | Chuang et al. | 375/227 |
| 6,891,810 B2 * | 5/2005 | Struhsaker et al. | 370/294 |
| 6,977,919 B1 * | 12/2005 | Stanwood | 370/350 |
| 6,985,534 B1 * | 1/2006 | Meister | 375/260 |
| 6,987,754 B2 * | 1/2006 | Shahar et al. | 370/349 |
| 7,023,798 B2 * | 4/2006 | Bourlas et al. | 370/230 |
| 7,075,967 B2 * | 7/2006 | Struhsaker et al. | 375/130 |
| 2002/0072885 A1 * | 6/2002 | Tang | 703/3 |
| 2002/0131486 A1 * | 9/2002 | Haartsen | 375/229 |

FOREIGN PATENT DOCUMENTS

| | | |
|---|---|---|
| EP | 0 507 384 A2 | 10/1992 |
| EP | 0 720 405 A2 | 7/1996 |
| EP | 0 891 060 A2 | 1/1998 |
| EP | 0 845 916 A2 | 6/1998 |
| WO | WO 92/22162 | 12/1992 |
| WO | WO 99/38343 | 7/1999 |
| WO | WO 99/39532 | 8/1999 |
| WO | WO 00/01188 | 1/2000 |

OTHER PUBLICATIONS

L.H. Charles Lee, "Convolutional Coding. Fundamentals and Applications", Artech House, Inc., 1997, p. 11-51.

Redl, et al., "An Introduction to GSM", Artech House, Inc., 1995; pp. 84, 85 and 95.

C.E. Shannon, "A Mathematical Theory of Communication", Bell System Technical Journal, pp. 379-423 (Part 1), 623-656 (Part II), Jul. 1948.

Ulm., et al., "Data-Over-Cable Interface Specifications, Radio Frequency Interface Specification", Hewlett Packard Interim Specification, Doc. Control No. SP-RFII01-970321, published Mar. 21, 1997 by MCNS Holdings, L.P., Section 6, pp. 43-85.

Wolf, et al., "On the Weight Distribution of Linear Block Codes Formed From Convolutional Codes", IEEE, IEEE Transactions on Communications, vol. 44:9, Sep. 1996.

"Asynchronous Transfer Mode (ATM) Technical Overview", $2^{nd}$ Edition, Prentice Hall, Oct. 1995, Chapter 3, pp. 21-25.

Sampei, S. et al., Adaptive Modulation/TDMA Scheme for Personal Multi-Media Communication Systems, (Nov. 28, 1994) Telecommunications Conference (Globecom), IEEE, pp. 989-993.

Ue, Toyoki et al., Symbol Rate and Modulation Level Controlled Adaptive Modulation/TDMA/TDD for Personal Communication Systems. (Jul. 25, 1995) Proceedings of the Vehicular Technology Conference, IEEE, vol. Conf. 45 pp. 306-310.

H.C. Papadopoulos et al., Reduction of Mixed Co-channel Interference in Microcellular STDD Systems, Vehicular Technology Conference. 1995 IEEE $45^{th}$, vol. 2, pp. 759-763.

Sater G., Stanwood K., Media Access Control Layer Proposal for the 802.16.1 Air Interface Specification, IEEE 802.16 Broadband Wireless Access Working Group, 'Online! Jul. 7, 2000, XP002210334 Retrieved from the Internet: <URL: http://wirelessman.org/tgl/mac/contrib/802161mc-00_21rf.pdf> retrieved on Aug. 20, 2002, pp. 69-80.

* cited by examiner

| Modulation Technique | Preferred Operating Signal to Noise Ratio | Equalizer Adaptation Factor | Adaptation Value |
| --- | --- | --- | --- |
| QPSK | 10-18db | QPSKµ | 1x |
| QAM-16 | 19-27db | QAM-16µ | 1.5x |
| QAM-64 | 27-40db | QAM-64µ | 2x |
| QAM-256 | >40db | QAM-256µ | 4x |

Figure 4

SYSTEM AND METHOD FOR MEASURING SIGNAL TO NOISE VALUES IN AN ADAPTIVE WIRELESS COMMUNICATION SYSTEM

RELATED APPLICATION

This application claims priority to Patent Application Ser. No. 60/308,255, filed Jul. 27, 2001, entitled SYSTEM AND METHOD FOR MEASURING SIGNAL TO NOISE VALUES IN AN ADAPTIVE WIRELESS COMMUNICATION SYSTEM, disclosure of which is incorporated herein by reference in its entirety.

BACKGROUND OF THE INVENTION

1. Field of the Invention

The present invention relates to wireless communication systems and to a system and method for measuring signal to noise ratios for a multi-modulation burst modem.

2. Description of the Related Art

A wireless communication system facilitates two-way communication between a plurality of subscriber radio stations or subscriber units (fixed and portable) and a fixed network infrastructure. Exemplary communication systems include mobile cellular telephone systems, personal communication systems ("PCS"), and cordless telephones. The key objective of these wireless communication systems is to provide communication channels on demand between the plurality of subscriber units and their respective base stations in order to connect a subscriber unit user with the fixed network infrastructure (usually a wire-line system). In the wireless systems having multiple access schemes, a time "frame" is used as the basic information transmission unit. Each frame is sub-divided into a plurality of time slots. Some time slots are allocated for control purposes and some for information transfer. Subscriber units typically communicate with their respective base station using a "duplexing" scheme thus allowing for the exchange of information in both directions of the connection.

Transmissions from the base station to the subscriber units are commonly referred to as "downlink" transmissions. Transmissions from the subscriber units to the base station are commonly referred to as "uplink" transmissions. Depending upon the design criteria of a given system, wireless communication systems have typically used either time division duplexing ("TDD") or frequency division duplexing ("FDD") methods to facilitate the exchange of information between the base station and the subscriber units.

Multiple techniques are available for modulating and demodulating the transmitted signal in a wireless communication system. These modulation techniques vary in their robustness. Typically, a more robust modulation technique has a lower transfer bit rate. However, information modulated with such a technique will be less prone to generating errors when demodulated at the receiving site due to adverse environmental conditions along the signal's path. A wireless communication system operates with both of these competing interests in mind.

Wireless communication systems perform some form of signal quality or error measurement on a received signal. These measurements often monitor changes in the environment between the subscriber unit and base station. These changes can impact a subscriber's quality of service. Based on these measurements, the wireless communication system can adapt its modulation technique for the changing conditions. However, these measurements may not be available to the subscriber unit. Without continual measurements, the subscriber unit is unable to stay abreast of environmental conditions which may subsequently impact its quality of service.

SUMMARY OF THE INVENTION

The systems and methods of the present invention have several features, no single one of which is solely responsible for its desirable attributes. Without limiting the scope of this invention as expressed by the claims which follow and as described herein, its more prominent features will now be discussed briefly.

One aspect is a wireless communication system capable of determining a signal to noise ratio ("SNR") for a multi-modulation downlink burst. The system comprises a base station configured to modulate a signal for transmission as a downlink burst to nodes using multiple modulation techniques and a node comprising a modem configured to measure a first SNR during a first portion of the downlink burst and measure a second SNR during a second portion of the downlink burst, the first portion being modulated using a preferred modulation technique and the second portion being modulated using a more robust modulation technique than the preferred modulation technique. The system further comprises a processor configured to receive the first and second SNRs and determine if the preferred modulation technique should be changed and an equalizer module in communication with the processor and configured to perform channel inversion on the second portion of the downlink burst utilizing an adaptation factor that is optimized for use with the preferred modulation technique.

Another aspect is a method for determining a signal to noise ratio ("SNR") for a multi-modulation burst modem which uses multiple modulation techniques for transmitting downlinks from a base station to a node, the node having a preferred modulation technique. The method comprises determining an adaptation factor for each modulation technique, selecting a first preferred adaptation factor for use by a node, the first preferred adaptation factor being optimized for a first preferred modulation technique of the node, receiving a first portion of a first downlink burst, the first portion being modulated using a first modulation technique, and determining a first SNR for the first portion using the first preferred adaptation factor. If the node receives its preferred modulation technique in a second portion of the first downlink burst, then determining a second SNR for the second portion using the first preferred adaptation factor, comparing the first and the second SNRs to one or more threshold values, selecting a second preferred modulation technique based on the comparison, and selecting a second preferred adaptation factor that is associated with the second preferred modulation technique. If the node does not receive its preferred modulation technique in the second portion of the first downlink burst, then comparing the first SNR to the one or more threshold values, selecting the second preferred modulation technique based on the comparison, and selecting the second preferred adaptation factor that is associated with the second preferred modulation technique.

Still another aspect is a method for changing a node's preferred modulation technique, the preferred modulation technique having an optimized preferred adaptation factor, the node being configured to receive data from a base station that uses a multi-modulation burst modem to transmit a downlink burst. The method comprises receiving a first portion of a downlink burst, the first portion being modulated using a modulation technique that is more robust than a preferred modulation technique, determining a first SNR for the first portion using a preferred adaptation factor that is optimized for the preferred modulation technique, and receiving a second portion of the downlink burst, the second portion being modulated using the preferred modulation technique. The method further comprises determining a second SNR for the second portion using the preferred adaptation factor, comparing the first and the second SNRs to one or more threshold values, and selecting a new preferred modulation technique based on the comparison.

BRIEF DESCRIPTION OF THE DRAWINGS

FIG. 4 is a table of modulation techniques, equalizer adaptation factors, and exemplary values associated thereto.

DETAILED DESCRIPTION OF THE PREFERRED EMBODIMENT

Throughout this description, the embodiments and examples shown should be considered as exemplars, rather than as limitations on the present invention.

Figure 1:
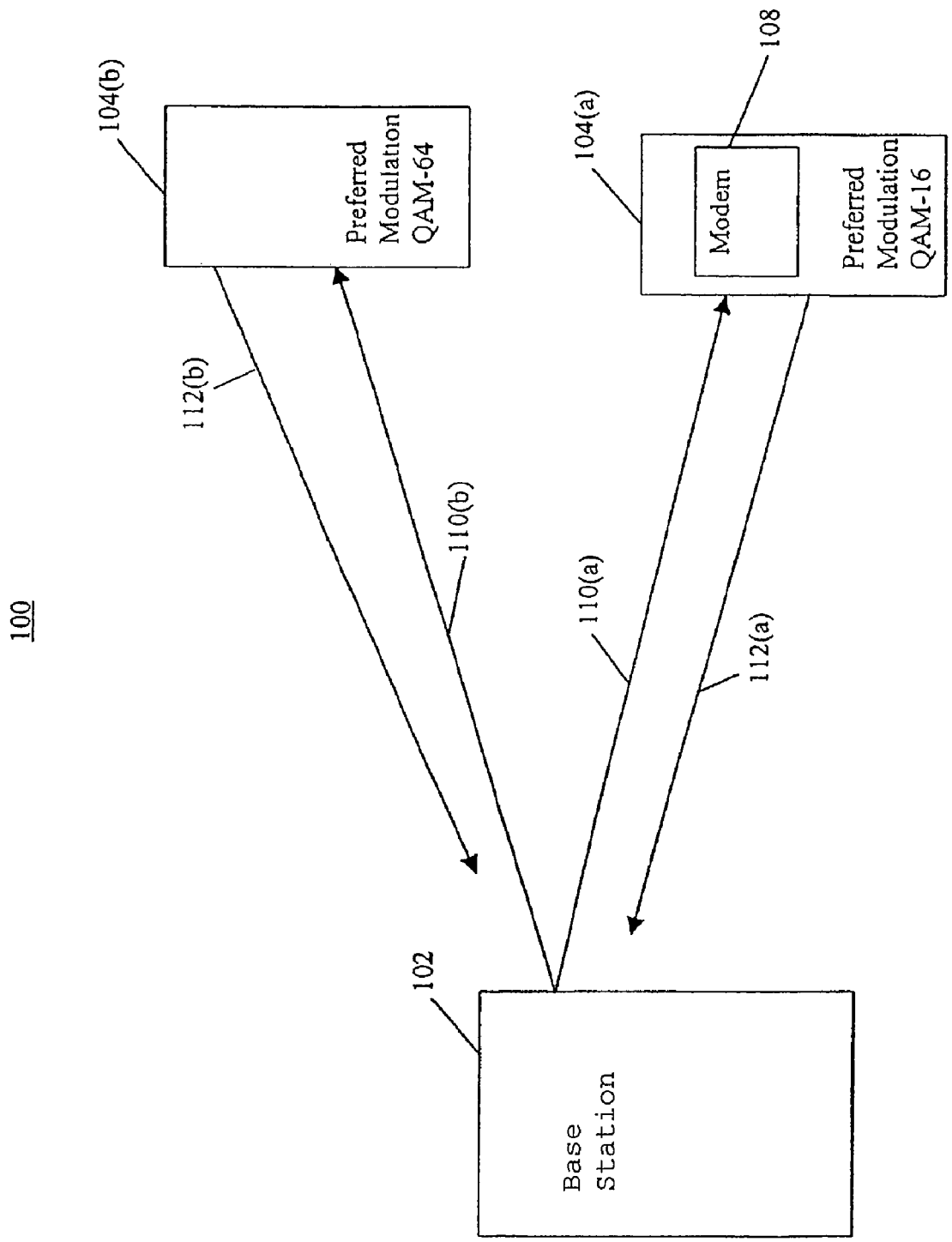
FIG. 1 is a simplified block diagram of a wireless communication system.

FIG. 1 is a block diagram of an exemplary wireless communication system 100. One such exemplary broadband wireless communication system is described in more detail in U.S. Pat. No. 6,016,311, to Gilbert et al., issued Jan. 18, 2000, entitled "Adaptive Time Division Duplexing Method and Apparatus for Dynamic Bandwidth Allocation within a Wireless Communication System," hereby incorporated by reference. The system 100 includes a base station 102 and at least one node 104(a)-(b) receiving and transmitting data along wireless communication links 110(a)-(b), 112(a)-(b). Nodes 104(a)-(b) are shown as examples, however, additional nodes can be included depending upon the design parameters of the system 100. FIG. 1 illustrates a system where two nodes 104(a), 104(b) are receiving and transmitting data with the base station 102 along communication link pairs 110(a) and 112(a), 110(b) and 112(b).

The communication links 110(a), 110(b) are referred to as downlinks (i.e., from the base station 102 to the nodes 104) and can operate on a point (base station)-to-multi-point (nodes) basis. Nodes 104(a), 104(b) receive the same transmission along their respective downlinks 110(a), 110(b). To distinguish between data intended for a specific node, the nodes monitor control information in their respective downlink 110(a), 110(b) and retain only the data intended for them.

The communication links 112(a), 112(b) are referred to as an uplink (i.e., from the nodes 104 to the base station 102) and operate on a point-to-point basis. Thus, in FIG. 1, each node 104(a), 104(b) originates its own uplink 112(a), 112(b). Communication with the base station 102 is bi-directional and can be multiplexed on the basis of Time Division Duplexing (TDD). For a TDD transmission from, for example, node 104(a), the node would send its data along uplink 112(a) to the base station 102 during a preassigned time slot in a transmission frame. The specific frame structures of the uplink and downlink will be discussed below.

Alternatively, the communications can be multiplexed on the basis of Frequency Division Duplexing (FDD). In such a system, duplexing of transmissions between the base station and the nodes is performed in the frequency domain. Different sets of frequencies are allocated for uplink and downlink transmissions. The system described herein can be used in such an FDD system.

The data transmitted along the communication links 110, 112 is in analog form, and thus a modem 108 is used to modulate the digital data prior to transmission. FIG. 1 illustrates the modem 108 being located at nodes 104(a)-(b), however, a similar or identical modem 108 may be used at the other end of the uplinks 112(a), 112(b) to demodulate the received analog data. Thus, the modems 108 in the nodes and base station are used for uplinking data from the nodes to the base station and for downlinking data from the base station to the nodes.

Still referring to FIG. 1, the modem 108 can be configured to select between multiple modulation techniques. Modulation techniques can be selected for each node 104(a)-(b) and base station 102 pair to accommodate the varying bandwidth needs of each node and the link characteristics. The selected modulation technique for node 104(a) is the "preferred" modulation for the communication links 110(a), 112(a). The selected modulation technique for node 104(b) is the "preferred" modulation for the communication links 110(b), 112(b).

For a given bandwidth, and a specific communication link quality, there is a limit to how many bits per second can be transported between a base station and a node with minimal errors. The amount of noise in a communication link will limit how many bits per second the communication link can transport. The communication link's quality varies for each node as a function of the characteristics of the pathway (i.e. geographic, rain or other environmental impairments) between each node and the base station. This quality can be measured using statistics, for example, a signal to noise ratio ("SNR"). SNR is a measure of signal strength relative to background noise. The preferred modulation technique can be a function of the capabilities and transmission quality of each node 104(a)-(b) and base station 102 pair.

For example, node 104(a) has a preferred modulation of QAM-16. Node 104(b), which is taking advantage of the improved weather between itself and the base station as compared to the weather between the base station and node 104(a), has a preferred modulation of QAM-64. Since node 104(a) has a preferred modulation of QAM-16, the data transmitted on communication links 110(a), 112(a) will be modulated using QAM-16. In the same system, node 104(b), which has a preferred modulation of QAM-64, transmits and receives along communication links 110(b), 112(b) using QAM-64. By using different modulation techniques for different nodes associated with a single base station, the communication system 100 as a whole increases its bandwidth utilization.

The transmission quality between the base station 102 and nodes 104(a)-(b) may also vary over time. For example, in FIG. 1, the transmission quality may significantly decrease during a rain or snowstorm. When the link quality is decreased, there is an increased chance that transmitted data along communication links 110(a), 110(b), 112(a), 112(b) may be unrecognizable or lost to the receiving base station or node. To accommodate these time variations in link quality, the communication system 100 dynamically adjusts or "adapts" the modulation technique for each base station 102 and node 104 pair. The modulation technique can be dynamically changed based on the SNR measured during the uplink and/or downlink between the node and base station. In such an adaptive system, the bandwidth utilization of the communication system 100 further increases.

The communication system 100 can select different modulation techniques for the uplink and downlink between each base station and node pair. Rather than selecting the same modulation technique for the uplink and downlink associated with each node, the communication system selects the uplink and downlink modulation techniques independently. When varying the downlink and uplink modulations between a node and base station pair, the SNR is monitored in both the uplink and downlink directions. Such a communication system is said to operate asymmetrically.

Still referring to FIG. 1, the base station stores the preferred modulation type for each node. Upon receiving modulated signals over uplinks 112(a)-(b), the base station calculates a SNR for each node's uplink. Generally, the SNR value is proportional to the $Log_{10}(AVG(error^2))$. Where the AVG(error$^2$) is determined from a comparison of the locations of a mapped ideal symbol and a mapped received symbol. More specifically, the error is calculated by taking the error in the "I" direction of the constellation map, squaring it and taking the error in the "Q" direction of the constellation map, squaring it, then adding the two values. The "I" and "Q" error values are averaged out, then the log of the average is calculated. This equation is referred to as a Mean Square Error ("MSE"). A look up table is used to convert the Log(MSE) to the SNR value for a particular modulation format.

The SNR of the received signal is used in determining the modulation technique that the communication system should employ for subsequent transmissions on that communication link. Based on the calculations, the base station can inform the node whether its uplink modulation should be changed. Similarly, the node can calculate a SNR for the downlink from the base station. However, since the base station is communicating with multiple nodes, each node often does not continually receive information from the base station. A node may only periodically receive data from the base station that is modulated using that node's preferred modulation. During the time that the node is not receiving data modulated using its preferred modulation, the environmental factors can degrade unbeknownst to that node. If this happens for an extended period of time, the node may fade beyond the point that it can successfully receive the next transmission destined for it.

Figure 2:
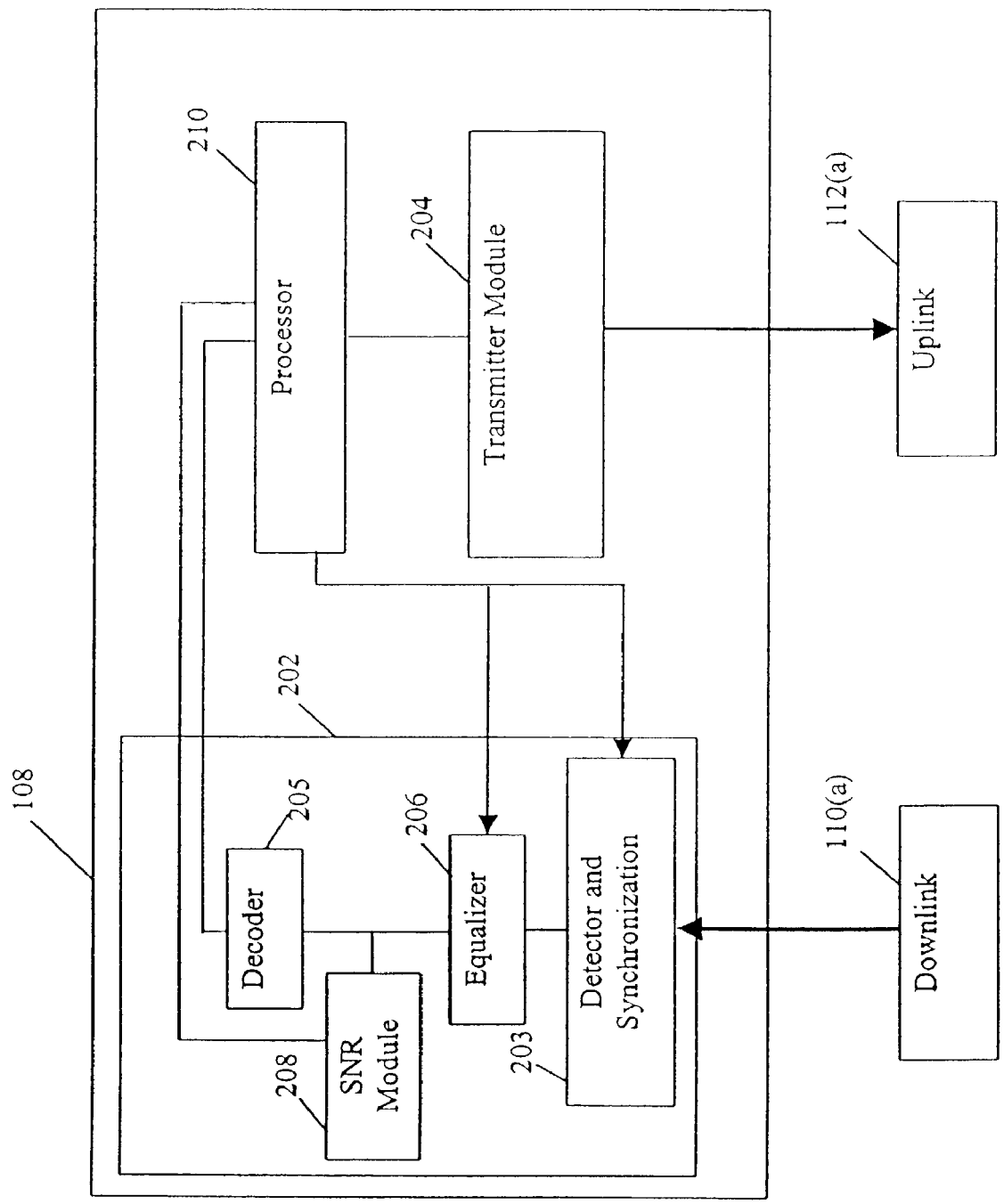
FIG. 2 is a block diagram of a Time Division Duplex ("TDD") modem.

FIG. 2 is a block diagram of a Time Division Duplex ("TDD") modem 108 configured to modulate/demodulate data in the wireless communication system 100 described above. Modems 108 are used by the base station 102 and nodes 104 from FIG. 1 to modulate and demodulate data. For ease of description, the modem 108 will now be described with reference to node 104(a).

As shown in FIG. 2, the modem 108 includes a receiver module 202, a transmitter module 204, and a processor module 210. The receiver module 202 receives a downlink 110(a) from the base station. The receiver module 202 then demodulates the signal and converts it back to its original digital form. To perform these tasks, the receiver module 202 includes a detector and synchronization module 203, an equalizer 206, a SNR module 208, and a decoder 205. The detector and synchronization module 203 is configured to identify the beginning of the downlink signal and synchronize the received modulated symbols to the equalizer module 206 and the decoder module 205. The equalizer module 206 processes the signal as will be more fully described below. The decoder module 205 demodulates the equalized signal by applying a demodulation technique that corresponds to the technique that was used by the base station to modulate the signal prior to its transmission to the node. Example modulation techniques include quadrature amplitude modulation ("QAM") or quadrature phase shift keying ("QPSK") modulation. Additional permutations of QAM, listed in the order of increasing complexity and higher bit transfer rates, are QAM-16 and QAM-64. In addition to waveform demodulation, the Decoder module 205 includes a number of processing stages, for example, forward error correction, message validation, message decryption and message formatting. The SNR module 208 measures the quality of the downlink signal. Once the quality of the downlink signal has been determined, the processor 210 is able to adjust the operating parameters of the receiver 202.

The term "module," as used herein, means, but is not limited to, a software or hardware component, such as a FPGA or ASIC, which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may advantageously be implemented to execute on one or more computers within the communication system.

The equalizer 206 assists the receiver module in demodulating the downlink signal by correcting for distortion introduced during the signal's transmission and during analog processing between the base station and node. (The process of equalization is well known in the art of demodulating a modulated signal and is explained in detail in *Proakis: Digital Communications*, 2$^{nd}$ edition ©1989 McGraw Hill.) These distortions can impact the phase and frequency of the downlink signal as well as contribute to multipath interference. These distortions can be the result of, for example, the weather conditions between the base station and the node. The equalizer further corrects for distortions caused by analog circuitry within the receiver module. This process is channel inversion.

The process of correcting for these distortions can be hastened by configuring the equalizer to "adapt" to the incoming signal. Such an equalizer is referred to being adaptive in that it utilizes parameters that were determined by the modem during a prior transmission and applies those parameters to the correct incoming signal. This allows the equalizer to predict what distortions, if any, that the incoming signal will likely have and quickly correct for them.

To this end, the equalizer 206 includes a digital finite impulse response ("FIR") filter (not shown) that has coefficient values that can change or adapt over time to the downlink 110(a). Such coefficient values can be referred to as tap values. The tap values can be adapted using a least mean square algorithm. The least mean square algorithm is gradient decent based and converges to a local minima by forcing the output of the FIR filter to a known state or to a training sequence. The tap values are updated using the following equation:

$$W(k)=W(k-1)-\mu \nabla J$$

W(k) is the value of the new tap value. W(k−1) is the value of the previous tap value at the last instant in time. μ is an adaptation factor which is selected based on the expected modulation of the received signal. The value of μ can vary between communication systems. Within a communication system, μ will vary based on the modulation technique employed to modulate the downlink. ∇J is a complex gradient which is defined based on communication system level parameters.

As mentioned above, the modulation technique utilized by the base station to modulate the downlink 110(a) depends in part on the noise in the communication link 110(a). The SNR module 208 measures this noise by calculating the SNR. The SNR is calculated after the equalizer corrects for distortions in the downlink 110(a). For communication links with a high SNR, a small μ value is used to converge the complex gradient. For communication links with a low SNR, a large μ value is used to hasten the convergence of the complex gradient. However, when a large μ is used to increase the rate at which convergence occurs, the accuracy with which the system reaches the local minima is decreased. The larger μ does not allow the complex gradient to optimally converge. This lack of convergence detrimentally impacts the new or adapted tap values. If these non-optimized tap values are used in the equalizer, the equalizer will be unable to sufficiently correct for distortions present in the received signal.

Still referring to FIG. 2, the SNR value calculated by the SNR module 208 is used by the processor 210 to select the preferred modulation. The processor 210 is configured to monitor the SNR values measured by the SNR module 208 over a period of time, and, in response to changes in these values, determine if the preferred modulation should be changed. If the SNR value is high, the preferred modulation technique can be changed to a less robust technique. If the SNR value is low, a more robust modulation technique may be selected as the preferred modulation by the processor 210. Measuring the SNR over a period of time helps avoid cyclic changes in the preferred modulation technique due to transient changes in the downlink's quality. The processor is shown in node 104(a), however, the processor may be located at the base station. When the processor is located at the base station, the SNR values calculated by the modem 108 are transmitted to the base station in uplink 112(a).

The calculated SNR is used by the modem to not only select its preferred modulation but also to select the adaptation value, μ, for use in its equalizer. The equalizer 206 uses the new μ value when calculating new tap values. Thus, if the processor 210 changes the preferred modulation to a different modulation, the equalizer 206 will select a μ value that is associated with the new preferred modulation.

Still referring to FIG. 2, the transmitter module 204 converts digital data to an appropriately modulated analog signal for its transmission on uplink 112(a). The analog signal can be up converted to a carrier frequency prior to its transmission.

Figure 3:
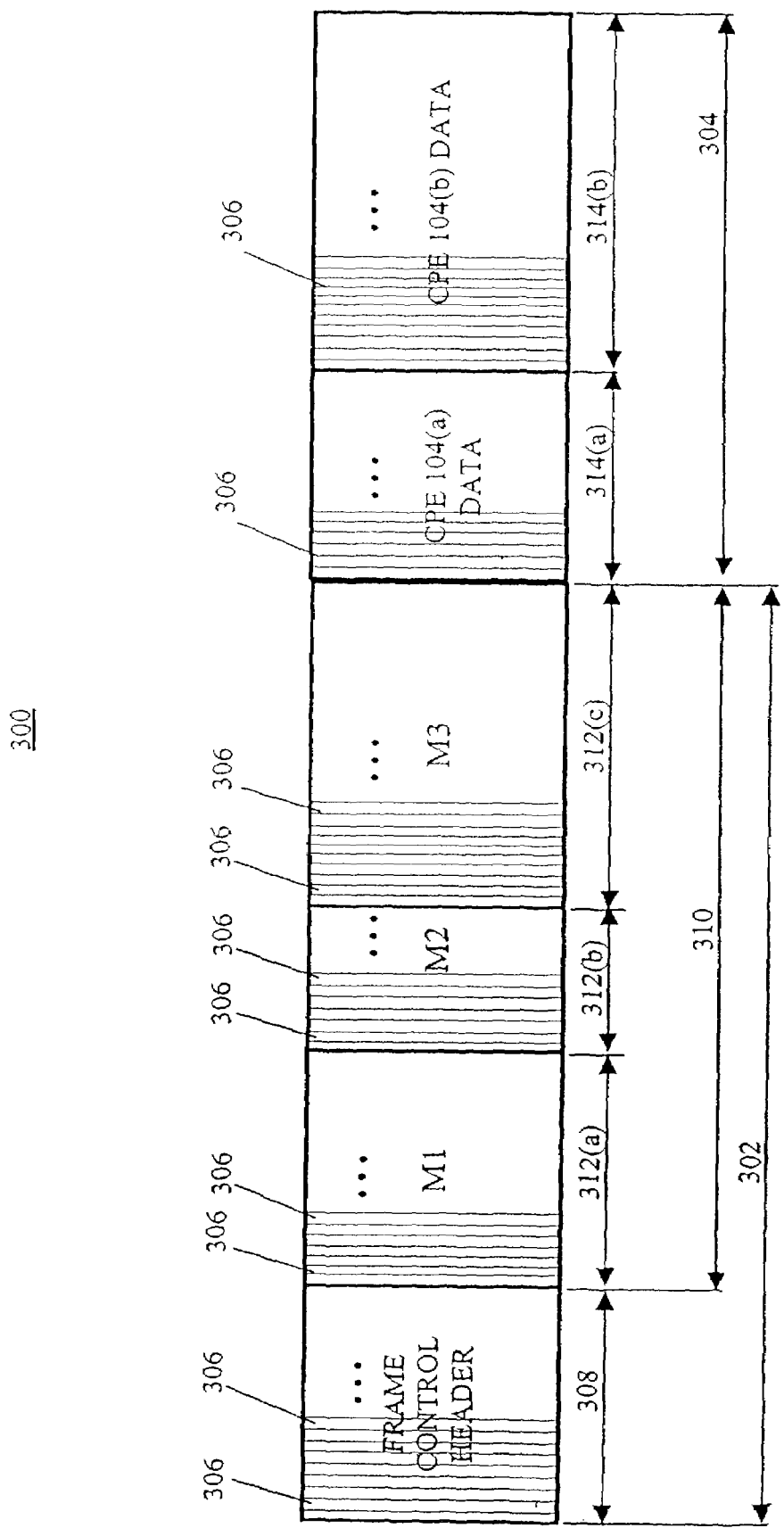
FIG. 3 is an illustration of the structure of a TDD frame.

FIG. 3 represents an example of a time division duplexing ("TDD") frame and multi-frame structure for use in communication system 100. Frame 300 includes a downlink subframe 302 and an uplink subframe 304. The downlink subframe 302 is used by the base station 102 to transmit information to nodes 104(a)-(b). In any given downlink subframe 302, all, some, or none of the transmitted information is intended for a specific node 104. The base station 102 may transmit the downlink subframe 302 prior to receiving the uplink subframe 304. The nodes 104(a)-(b) transmit information to the base station 102 using the uplink subframe 304.

Subframes 302, 304 are subdivided into multiple physical layer slots (PS) 306. Each PS 306 correlates with a duration of time. For example, 300 can be one-half millisecond in duration and include 800 PS per frame 300. Alternatively, frames having longer or shorter durations and with more or fewer PSs can be used. Alternatively, the size of the frame and subframes can vary.

Each downlink subframe 302 comprises a frame control header 308 and downlink data 310. The frame control header 308 includes information for the nodes to synchronize with the base station. The frame control header 308 can include control information indicating where modulation changes occur in the downlink. The frame control header 308 can also include a map of the subsequent uplink subframe 304 that is to be transmitted by the nodes. This map allocates the PSs 306 in the uplink subframe 304 between the different nodes. The frame control header 308 can further include a map of attributes of the downlink data 310. For example, attributes may include, but are not limited to, the locations of the PSs 306 in the subframe 302 that are intended for each individual node.

The downlink data 310 is transmitted in a pre-defined modulation or a sequence of modulation techniques M1, M2, M3. Individual or groups of PSs 306 in the downlink subframe 302 are assigned to data intended for specific nodes. For example, the base station could assign PSs in one, some, or all of the modulation techniques M1, M2, M3 for transmitting data to node 104(a). Assuming that node 104(a)'s preferred modulation technique is the least robust technique that it can receive without undue errors, the base station will not modulate downlink 110(a) using a less robust technique than the node 104(a)'s preferred modulation.

In FIG. 3, the data is divided into three modulations types, where QPSK (312(a)) is the most robust modulation (i.e. least prone to transmission errors caused by signal interference) and while QAM-64 (312(c)) is the least robust (i.e. most prone to transmission errors caused by signal interference). In between these modulation schemes is QAM-16 (312(b)). A sequence such as: QAM-4, followed by QAM-16, followed by QAM-64 can be used. Alternatively, additional modulation techniques and/or forward error correction techniques, can be used. Thus, each node 104 demodulates the frame control header 308 and also monitors the downlink data 310. Each node retains only those messages in the downlink data that is intended for them.

The uplink subframe 304 comprises uplink data 314(a)-(b). The uplink subframe 304 is used by the nodes 104(a)-(b) to transmit information to the base station 102. The subframe 304 is subdivided into a plurality of PSs 306. Each node 104(a)-(b) transmits its information during its allocated PS 306 or range of PSs 306. The PSs 306 allocated for each node can be grouped into a contiguous block within a data block 314.

Nodes 104(a)-(b) receive all downlink transmissions from the base station 102. The frame control header 308 is typically modulated using the most robust modulation scheme to ensure that all nodes may receive it, for example, QPSK modulation. Each node maintains its connection throughout the downlink subframe 302. If the downlink frame includes PS that were modulated using a less robust technique than the node's preferred modulation, those PS's will not be seen or recognized by the node.

FIG. 4 is a table of modulation techniques, equalizer adaptation factors, and values associated thereto for use by the communication system of FIG. 1. The values shown in FIG. 4 are selected for the communication system based on system level design parameters. These values are used by each node in determining its preferred modulation as well as the correct adaptation factor $\mu$ for its preferred modulation.

More specifically, the processor 210 (see FIG. 1) compares the SNR value calculated by the SNR module 208 to the preferred operating signal to noise ratios in FIG. 4. Based on this comparison, the preferred modulation may be changed to a more or less robust technique. If the preferred modulation technique is changed, the $\mu$ value associated with the preferred modulation will also be selected for use in calculating new tap values. The new tap values are then used in the equalizer to correct for distortions that are present in the downlink signal modulated using the new preferred modulation.

Figure 5:
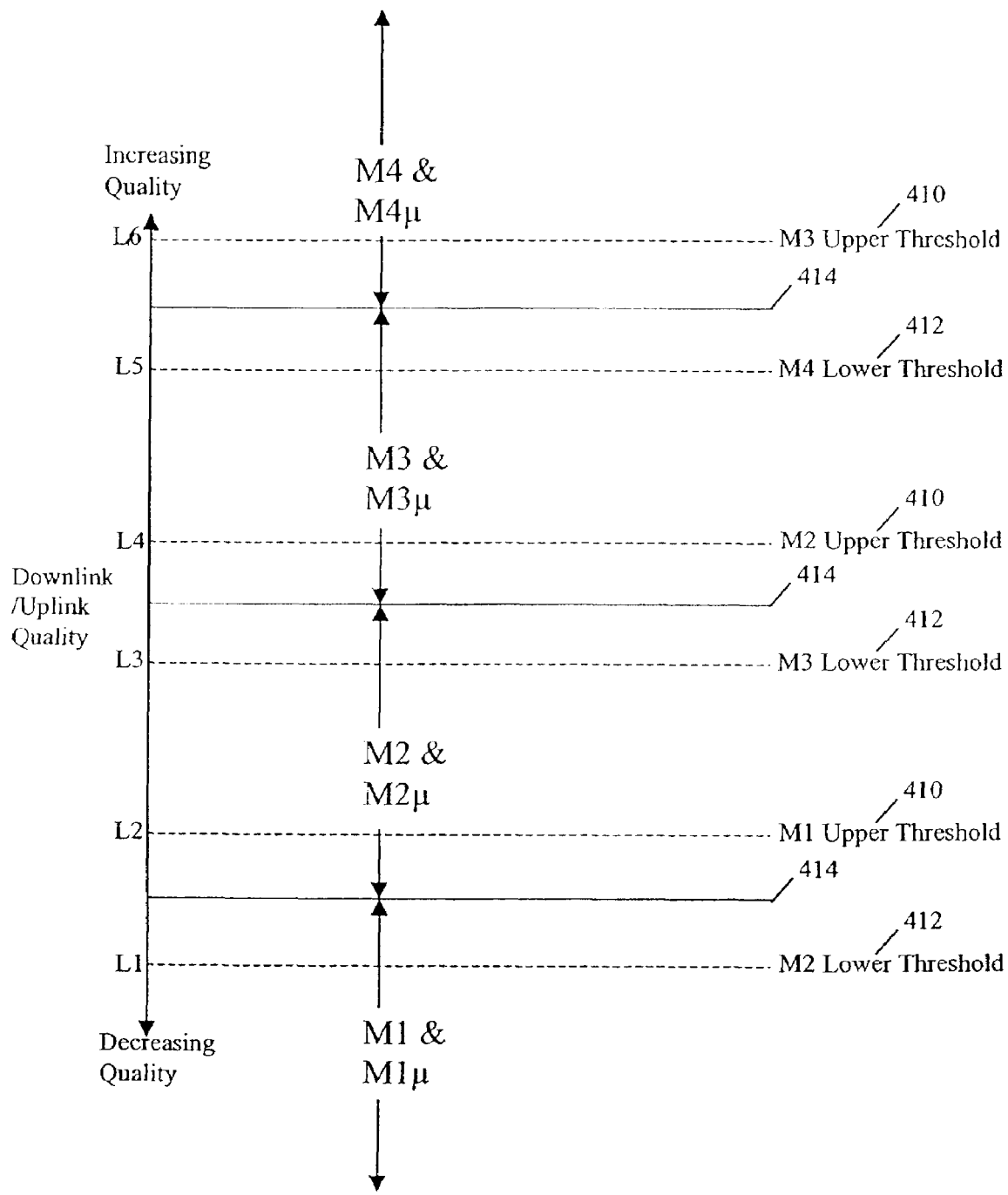
FIG. 5 is a graph of multiple preferred modulation techniques, M1-M4, with their respective upper and lower modulation thresholds and their associated adaptation factors.

FIG. 5 illustrates a graph of four modulation schemes, their respective upper and lower modulation thresholds, and their associated adaptation factors, $\mu$. Specifically, four modulation schemes (M1-M4, where M1 is the most robust and M4 is the least robust), and six modulation thresholds (L1-L6, where L1 indicates the lowest link quality and L6 indicates the highest link quality) are shown. Adaptation factors M1$\mu$, M2$\mu$, M3$\mu$, and M4$\mu$ are also shown. For ease of description, the following discusses the modulation techniques and thresholds with respect to node 104(a). However, the following description can also apply to the base station or other nodes.

Lines 414 separate the modulation schemes and are based on an analytical relationship between link quality and modulation techniques. The thresholds L1-L6 can be identical for the uplink and downlink, such that modulation transition points are the same for both the uplink and the downlink. The thresholds are based on measurements of the quality of the downlink 110(a). The quality of the downlink is based on the SNR measured by the SNR module 208. For ease of description, the following assumes the modulation thresholds for the uplink and downlink are the same. The following description would then apply to both the uplink and downlink. Alternatively, the modulation thresholds for the uplink and downlink can be different.

Still referring to FIG. 5, modulation schemes M2 and M3 each have a pair of modulation thresholds associated thereto. Modulation techniques M1 and M4 each have a single threshold associated thereto since they are the minimum and maximum modulation techniques. The modulation thresholds include upper thresholds 410 and lower thresholds 412. As the downlink/uplink quality exceeds the upper threshold 410, the modulation scheme is increased. This is accomplished by selecting a denser and less robust modulation scheme. Conversely, as the lower threshold 412 is crossed, the modulation scheme is decreased. For example, thresholds L1 and L4 are the thresholds for modulation scheme M2. If the downlink/uplink quality using M2 falls below L1, the receiving base station 102/node 104(a) will send a request to change the modulation technique to M1. Alternatively, if the downlink/uplink quality using M2 rises above L4, the receiving base station 102/node 104(a) will send a request to change the modulation technique to a higher type, for example, M3.

Figure 6:
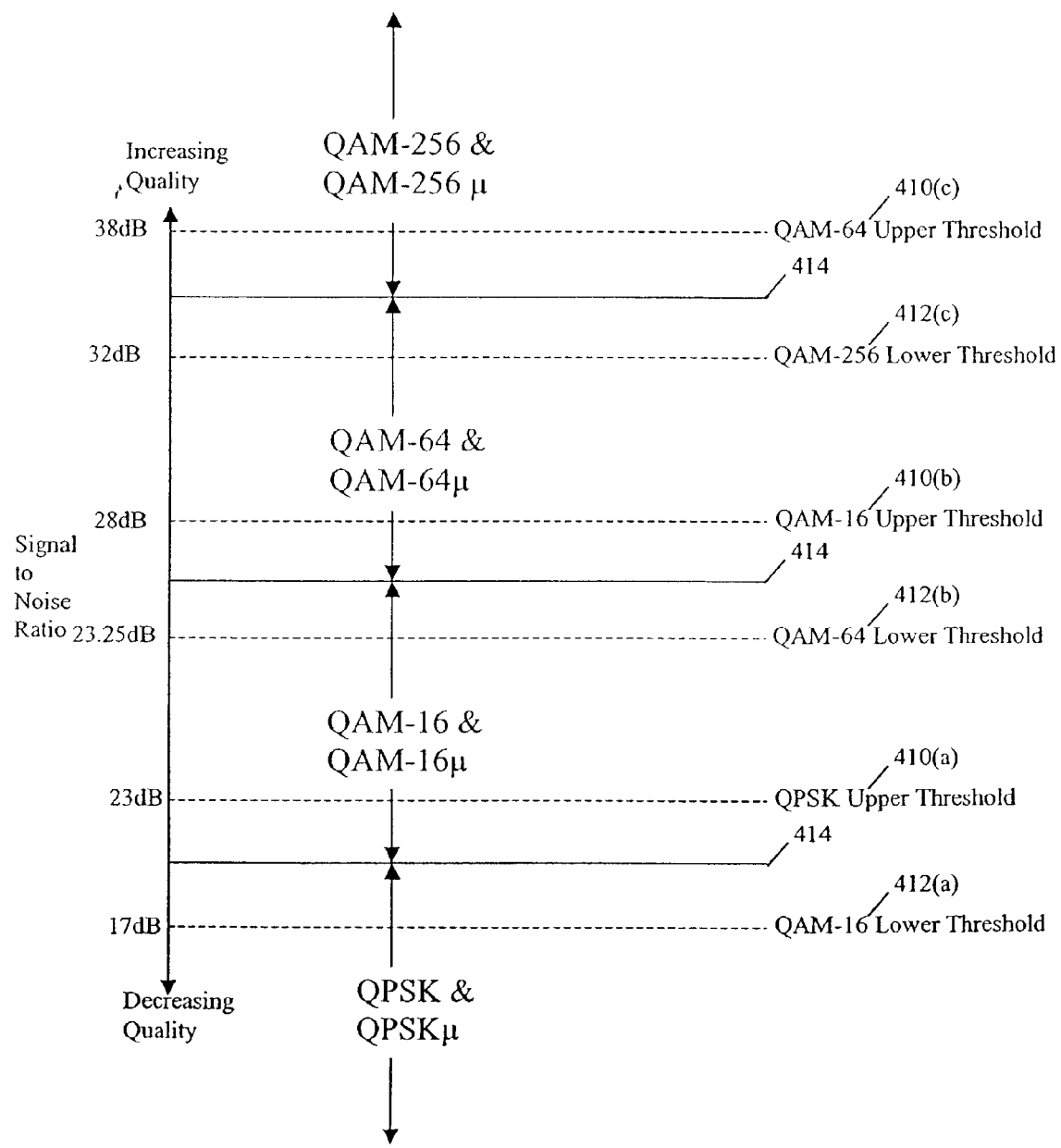
FIG. 6 is a graph showing preferred modulation techniques, QAM-256, QAM-64, QAM-16, and QPSK, with upper and lower signal to noise ratios ("SNR") thresholds and their associated adaptation factors, QAM-256μ, QAM-64μ, QAM-16μ, and QPSKμ.

FIG. 6 shows modulation techniques QAM-256, QAM-64, QAM-16, and QPSK along with their respective upper and lower modulation thresholds for measuring signal to noise ratios ("SNR"). Adaptation factors, QAM-256$\mu$, QAM-64$\mu$, QAM-16$\mu$, and QPSK$\mu$ are also shown. The modulation thresholds for QAM-64 transmissions are QAM-64 upper threshold 410(c) and QAM-64 lower threshold 412(b). For example, if base station 102 is currently downlinking data to node 104(a) using QAM-16 modulation, the modulation scheme will change when the downlink 110(a) quality goes above upper threshold 410(b), for example, at 28 dB. Likewise, when the downlink 110(a) quality goes below lower threshold 412(a), for example, at 17 dB, the modulation scheme will change. Furthermore, the modulation scheme will not be changed when link quality crosses either QAM-64 lower threshold 412(b) or QPSK upper threshold 410(a) because they are not the modulation thresholds for QAM-16.

Figure 7:
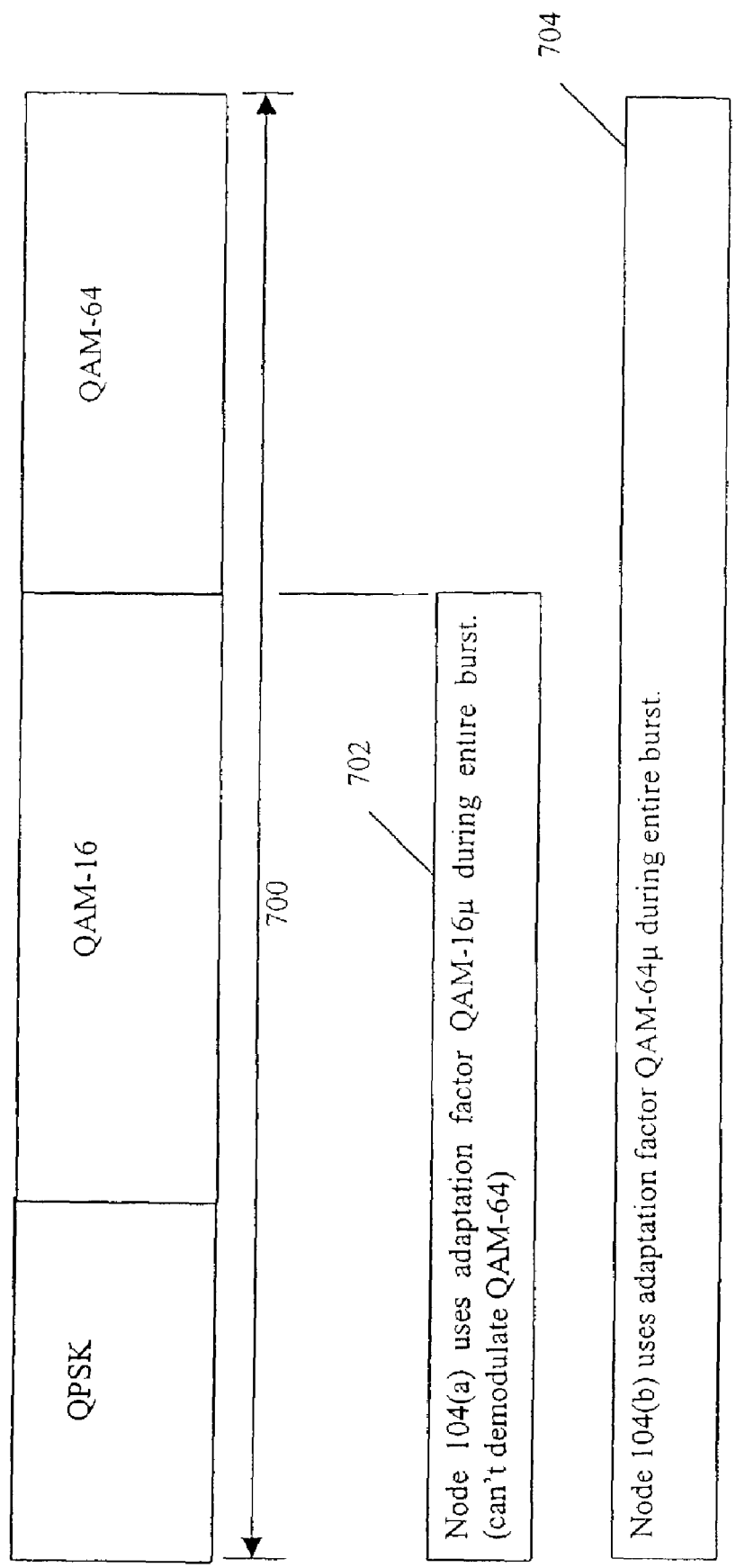
FIG. 7 is a chart showing selected adaptation factors being used by nodes 104(a), 104(b) to determine a SNR value for a downlink burst, which includes their preferred modulations.

FIG. 7 is a chart showing selected adaptation factors used, for example, by nodes 104(a), 104(b) from FIG. 1, to determine a SNR for the data transmitted in downlinks 110(a)-(b). Node 104(a) is shown using QAM-16$\mu$ 702. Node 104(b) is shown using QAM-64$\mu$ 704. In FIG. 7, downlink burst 700 comprises both nodes' preferred modulations. In total, the downlink burst 700 comprises three modulation types, QPSK, QAM-16, and QAM-64. For ease of description, only three modulation types will be discussed, however, the system can be used with any communication system which includes multiple modulations.

In this example, Node 104(a)'s preferred modulation is QAM-16. Node 104(a) is currently unable to demodulate a less robust modulation without incurring an undue number of errors in the received data. Node 104(a) selects an adaptation factor that has been optimized for its preferred modulation, QAM-16. This optimized adaptation factor is used by node 104(a)'s equalizer in calculating its tap values. The tap values are used by the equalizer to perform channel inversion to the signal on communication link 110(a). New SNR values are measured during the differently modulated portions of the downlink burst that node 104(a) is able to demodulate. These values are measured based on the equalized symbol values as compared to the ideal symbol values. Thus, node 104(a) measures SNR values during the QPSK portion and the QAM-16 portion of the downlink burst. Between the measurements made during the different modulations, node 104(a) selects at least one to determine whether it should change its preferred modulation. These SNR values are compared to the QAM-16 threshold values (see FIG. 6).

The measurement range for the SNR value calculated during different modulations typically vary when the same adaptation factor is used to calculate the tap values for the different modulations. For example, by using the QAM-16 adaptation factor during the QPSK portion of the downlink, the calculated SNR value will fall within a range of 10-29 db. When calculating the SNR value during the QAM-16 portion of the downlink using the QAM-16 adaptation factor, the range decreases to 19-29 db. If we assume that the actual SNR for communication link 110(a) is still within the QAM-16 range, then it would be preferable for node 104(a) to use the SNR value calculated during the QAM-16 portion of the downlink since the measurement's fidelity will be increased. Alternatively, if the actual SNR is not within the QAM-16 range, node 104(a) can select the SNR value calculated during the QPSK portion of the downlink.

Node 104(b)'s preferred modulation is QAM-64. Node 104(b) is able to demodulate the entire downlink burst without incurring an undue number of errors in the received data. Node 104(b) selects an adaptation factor that has been optimized for its preferred modulation, QAM-64. This optimized adaptation factor is used by node 104(b)'s equalizer in calculating its tap values. The tap values are used by the equalizer to perform channel inversion to the signal on communication link 110(b). New SNR values are measured during the differently modulated portions of the downlink burst. These values are measured based on the equalized symbol values as compared to the ideal symbol values. Thus, node 104(b) measures SNR values during the QPSK, QAM-16, and the QAM-64 portions of the downlink burst. Between the measurements made during the different modulations, node 104(b) selects at least one to determine whether it should change its preferred modulation. These SNR values are compared to the QAM-64 threshold values (see FIG. 6).

The ranges for node 104(b)'s SNR values are based on its use of the QAM-64 adaptation factor during the entire downlink burst. For example, by using the QAM-64 adaptation factor during the QPSK portion of the downlink, the calculated SNR value will fall within a range of 10-40 db. When calculating the SNR value during the QAM-16 portion of the downlink using the QAM-64 adaptation factor, the range decreases to 19-40 db. When calculating the SNR value during the QAM-64 portion of the downlink using the QAM-64 adaptation factor, the range further decreases to 27-40 db. If we assume that the actual SNR for communication link 110(b) is still within the QAM-64 range, it would be preferable for node 104(b) to use the SNR value calculated during the QAM-64 portion of the downlink since the measurement's fidelity will be increased. Alternatively, node 104(b) can select the SNR value calculated during the other portions of the downlink.

Figure 8:
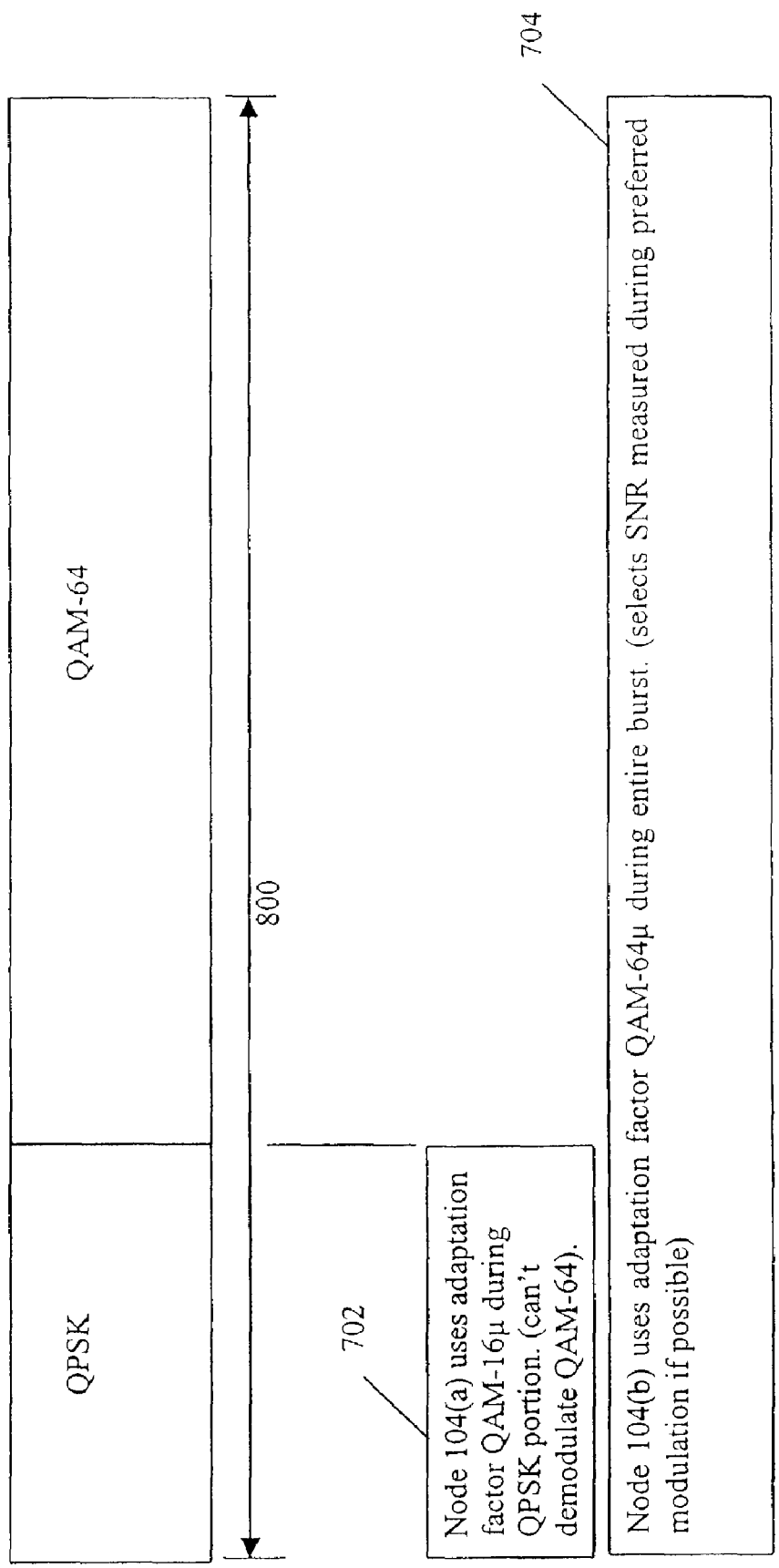
FIG. 8 is a chart showing selected adaptation factors being used by nodes 104(a), 104(b) to determine a SNR value for a downlink burst, which does not include node 104(a)'s preferred modulation.

FIG. 8 is a chart showing selected adaptation factors used, for example, by nodes 104(a), 104(b) from FIG. 1, to determine a SNR for the data transmitted in downlinks 110(a)-(b). Node 104(a) is shown using QAM-16μ 702. Node 104(b) is shown using QAM-64μ 704. In FIG. 8, the downlink burst 800 does not include node 104(a)'s preferred modulations. Downlink burst 800 includes two modulation types, QPSK and QAM-64.

Node 104(a)'s preferred modulation is QAM-16. Node 104(a) is currently unable to demodulate a less robust modulation without incurring an undue number of errors in the received data. Since node 104(a)'s preferred modulation is not present in downlink burst 800, node 104(a) is unable to measure a SNR value for data that was modulated using its preferred modulation. However, node 104(a) is able to measure SNR values during the QPSK portion of the downlink burst.

Node 104(a) uses an adaptation factor, QAM-16μ, that has been optimized for its preferred modulation, QAM-16. Node 104(a) calculates the SNR values during the QPSK modulated portion of the downlink burst. These values are measured based on the equalized symbol values as compared to the ideal symbol values. For example, by using the QAM-16 adaptation factor during the QPSK portion of the downlink, the calculated SNR value can fall within a range of 10-27 db. By applying the QAM-16μ during the QPSK portion of the downlink burst, this range is increased beyond QAM-16's preferred operating range of 19-27 db. This allows node 104(a) to monitor the quality of the downlink 110(a) even when the downlink burst does not include its preferred modulation. If the quality of the downlink 110(a) has dropped below QAM-16's preferred operating range of 19-27 db, node 104(a) is able to measure SNR values. If the downlink experiences a fade such that the SNR drops below the QAM-16 threshold, the base station can be alerted by node 104(a) to not send QAM-16 packets to node 104(a) until the SNR has increased. Alternatively, the node 104(a) is able to determine whether it should change its preferred modulation to a modulation technique that will allow the node 104(a) to perform demodulation without incurring an undue number of errors.

Node 104(b)'s preferred modulation is QAM-64. Node 104(b) is able to demodulate the entire downlink burst without incurring an undue number of errors in the received data. Node 104(b) selects an adaptation factor that has been optimized for its preferred modulation, QAM-64. Since downlink burst 800 includes QPSK and QAM-64 modulated data, node 104(b) can measure SNR values during both modulations. These values are measured based on the equalized symbol values as compared to the ideal symbol values. Thus, node 104(b) measures SNR values during the QPSK and QAM-64 portions of the downlink burst.

The ranges for node 104(b)'s SNR values are based on its use of the QAM-64 adaptation factor during the entire downlink burst. For example, by using the QAM-64 adaptation factor during the QPSK portion of the downlink, the calculated SNR value will fall within a range of 10-40 db. When calculating the SNR value during the QAM-64 portion of the downlink using the QAM-64 adaptation factor, the range decreases to 27-40 db. If we assume that the actual SNR for communication link 110(b) is still within the QAM-64 range, it would be preferable for node 104(b) to use the SNR value calculated during the QAM-64 portion of the downlink since the measurement's fidelity will be increased. If the quality of the downlink is below a SNR value of 27 db, node 104(b) can select the SNR value calculated during the QPSK portion of the downlink. Node 104(b) will use its selected SNR value for comparison with the QAM-64 thresholds (see FIG. 6) to determine whether it should change its preferred modulation.

Figure 9:
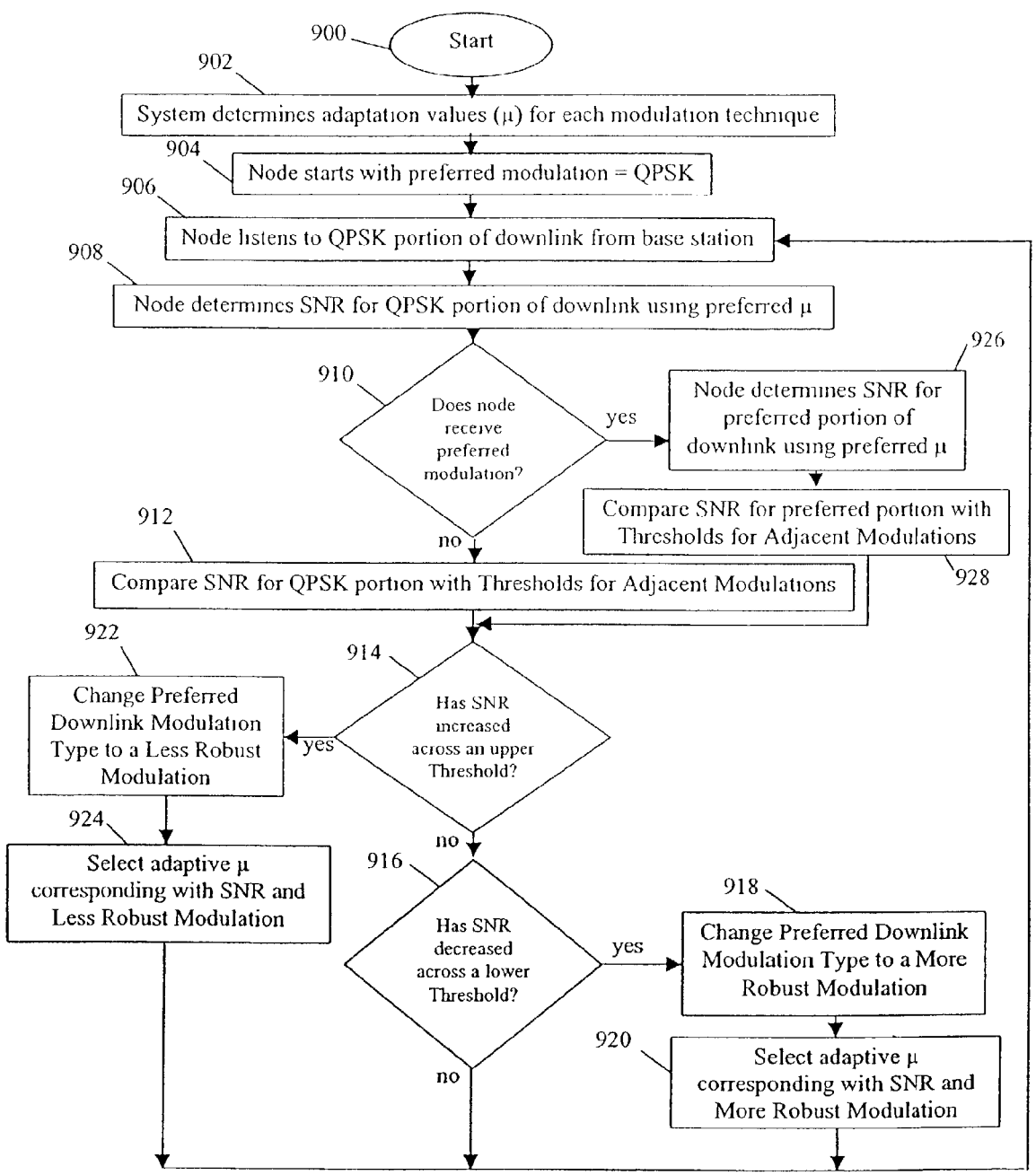
FIG. 9 is a flowchart of the process of determining a signal to noise ratio for a received downlink burst.

FIG. 9 is a flowchart illustrating a node performing the process of determining a signal to noise ratio for a received downlink burst. Once determined, the node can change its preferred downlink modulation along with its adaptation factor, μ. The process can be performed during each frame 300 (see FIG. 3), or periodically over several frames. Alternatively, the process is performed after each received symbol or group of symbols. Each node can determine the quality of its downlink. Once determined, the node can report the SNR back to the base station or determine itself whether its preferred downlink modulation should be changed. If the node determines that its preferred modulation should be changed, the node sends a request to the base station to use a different modulation technique. The base station is then able to adjust its downlink modulation accordingly for the specific node. The node selects an adaptation factor, μ, which is optimized for the new preferred modulation. The adaptation factor, μ, is used by the node's receiver.

In particular, flow begins in start block 900. Flow proceeds to block 902, where the communication system determines the adaptation values for each modulation. The base station determines the adaptation values and provides them to the node. Alternatively, the node determines these values. Examples of modulation techniques along with their associated adaptation values are shown in FIG. 4. Flow continues to block 904 where the node starts with the preferred modulation of QPSK. QPSK is the most robust modulation technique available to the node in this example and its selection increases the likelihood that the node will be successful in demodulating the base station's downlink. The node will select a preferred adaptation factor, QPSKμ, for use in its receiver. Alternatively, the node can start with any modulation technique that the node is able to demodulate along with its associated adaptation factor. For example, the node could begin with QAM-16 and μQAM-16 assuming that the node is able to demodulate QAM-16.

Flow next moves to block 906 where the node receives the QPSK portion of the downlink that is transmitted by the base station. The process continues to block 908 where the node determines a SNR for the received QPSK portion using the preferred adaptation factor, QPSKμ. The SNR may be a function of the state of the transmission medium (e.g. air, foggy air, wet air, smoky air, etc.) and the ability of both the transmitting and receiving components (e.g. base station and node) to respectively transmit and receive data. The node equalizes the incoming QPSK signal and calculates the SNR. For example, the SNR value can be proportional to the $\text{Log}_{10}$ ($\text{AVG}(\text{error}^2)$). The AVG(error) is determined from a comparison of the locations of a mapped ideal QPSK symbol and a mapped received QPSK symbol. More specifically, the error is calculated by taking the error in the "I" direction of the constellation map, squaring it and taking the error in the "Q" direction of the constellation map, squaring it, then adding the two values. The "I" and "Q" error values are averaged out, then the log of the average is calculated. This equation is referred to as a Mean Square Error ("MSE"). A look up table is used to convert the Log(MSE) to the SNR value for QPSK.

Alternatively, the base station can receive the error measurements and determine the SNR for its downlink to that node. A single SNR measurement or a series of several SNR measurements taken by the node during a frame 300 (see FIG. 3) or during multiple frames may be used to determine the downlink SNR. The processor 210 (see FIG. 2) can analyze multiple measurements to determine the downlink's SNR. For example, SNR measurements may be averaged over N frames 300 to generate the downlink SNR measurement. Alternatively, the node transmits its measurements to the base station for analysis by a processor in the base station. The base station then determines the SNR for the downlink to that node.

Continuing to decision block 910, if the node does not receive its preferred modulation in downlink frame 300, flow proceeds to block 912 where the SNR for the QPSK portion is compared to the threshold values for the adjacent modulations. The current modulation thresholds include an upper threshold and a lower threshold at which the modulation technique is changed (see FIG. 6). Since QPSK is the most robust modulation, it has only an upper threshold value. With reference to FIG. 6, the current modulation threshold for a QPSK transmission is QPSK upper threshold 410(*a*).

Next at decision block 914, a determination is made as to whether the SNR has increased across an upper threshold according to the comparisons made in block 912. With reference to FIG. 6, when the modulation is QPSK the current modulation upper threshold 410(*a*) is 23 dB. For QAM-64, the current modulation upper threshold 410(*c*) is 38 dB. For QAM-16, the current modulation upper threshold 410(*b*) is 28 dB. If the SNR has not increased across an upper threshold, flow proceeds to decision block 916.

At decision block 916, a determination is made as to whether the downlink SNR has crossed a lower modulation threshold. With reference to FIG. 6, when the current modulation is QAM-64, the current modulation lower threshold 412(*b*) is 23.25 dB. For QAM-16, the current modulation lower threshold 412(*a*) is 17 dB. If the current modulation lower threshold has not been crossed, flow returns to block 906. If the SNR has crossed a lower threshold, flow proceeds to block 918 where the preferred downlink modulation is changed to more robust modulation. For example, listed in order of increasing robustness are the modulation techniques QAM-256, QAM-64, QAM-16, and QPSK. The node sends a request to the base station indicating the desired preferred modulation. This request is sent during the uplink. Once received by the base station, a downlink modulation change confirmation can be transmitted to the node indicating in which frame 300 the change will occur. Alternatively, the node listens for its data at both the current modulation and the requested, more robust, modulation to determine if its preferred modulation has been changed. Because the node receives all data transmitted by the base station, a change in modulation will be evident to a specific node when data is received using the requested preferred modulation technique. The process continues to block 920 where the node selects an adaptive μ that corresponds with the SNR and the more robust modulation technique selected in block 918. Flow then returns to block 906 where the node listens to the QPSK portion of the next downlink frame from the base station.

Referring back to decision block 914, if the SNR has increased across an upper threshold, the process moves to block 922 where the preferred modulation technique is changed to a less robust, denser modulation. The node determines the downlink SNR and sends a request to the base station indicating a desired preferred downlink modulation. Once received by the base station, a preferred downlink modulation change confirmation is transmitted to the node. The confirmation indicates in which frame 300 the preferred modulation will be changed. Alternatively, the node listens for its data at both the current modulation and the requested preferred, less robust, modulation. Because the node receives all data transmitted by the base station, a change in modulation will be evident to the node if it receives data that was modulated using the requested preferred modulation technique. The process continues to block 924 where the node selects an adaptive μ that corresponds with the SNR and the less robust modulation technique selected in block 922. Flow then returns to block 906 where the node listens to the QPSK portion of the next downlink frame from the base station.

Referring back to decision block 910, if the node does receive its preferred modulation, flow moves to block 926 where the node determines the SNR for the preferred portion downlink using the preferred μ value. Flow then continues to block 928 where the node compares the SNR for the preferred portion of the downlink frame with the threshold values for the adjacent modulations. Flow then continues to decision block 914 as described above.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the embodiments should not be taken to imply that the terminology is being re-defined herein to be restricted to including any specific characteristics of the features or aspects of the embodiment with which that terminology is associated. The scope of the embodiments should therefore be construed in accordance with the appended claims and any equivalents thereof.

What is claimed is:

1. A wireless communication system, comprising:
  a base station configured to transmit a signal as a downlink burst, the downlink burst including a portion modulated with a modulation technique; and
  a processor coupled to the base station and configured to receive, in an uplink transmission from a recipient node in response to a receipt of the downlink burst from the base station, a signal-to-noise ratio (SNR) measurement measured by the recipient node during the portion of the downlink burst, the portion addressed to one of a plurality of wireless nodes other than the recipient node, the processor further configured to determine, based on the received SNR measurement, whether a current preferred modulation technique of the recipient node should be changed for future downlink communication addressed to the recipient node.

2. The system of claim 1, wherein the modulation technique that modulates the portion of the downlink burst is selected from a group consisting of quadrature amplitude modulation ("QAM")-16, quadrature phase shift keying ("QPSK") modulation, and QAM-64.

3. The system of claim 1, wherein the portion is a first portion, the modulation technique that modulates the first portion is a first modulation technique, the downlink burst further includes a second portion modulated with a second modulation technique, and the first portion comprises a control header of the downlink burst.

4. The system of claim 3, wherein the second portion is addressed to one of the plurality of wireless nodes other than the recipient node.

5. The system of claim 3, wherein the first modulation technique is more robust than the second modulation technique.

6. The system of claim 1, wherein the portion is a first portion, and the downlink burst includes a second portion modulated with a second modulation technique.

7. The system of claim 1, wherein the downlink burst includes no portion addressed to the recipient node.

8. The system of claim 1, wherein the processor is further configured to compare the received SNR measurement to a SNR range associated with the current preferred modulation technique, the SNR range including a bottom threshold and a top threshold, and the processor is configured to change the current preferred modulation technique to a more robust modulation technique if the received SNR measurement is lower than the bottom threshold and the processor is configured to change the current preferred modulation technique to a less robust modulation technique if the received SNR measurement is higher than the top threshold.

9. The system of claim 1, wherein the portion is one of two portions of the downlink burst, each portion modulated with one of a plurality of available modulation techniques, the SNR measurement is one of two SNR measurements received from the recipient node corresponding to the two portions, respectively, and the processor is further configured to select, from the two SNR measurements, the SNR measurement to be used to determine whether to change the current preferred modulation technique.

10. The system of claim 9, wherein the processor is configured to identify whether one of the two SNR measurements is a preferred SNR measurement corresponding to a portion modulated with the current preferred modulation technique associated with the recipient node, and, if so, to select the preferred SNR measurement to be used to determine whether to change the current preferred modulation technique.

11. An apparatus, comprising:
a modem configured to receive a downlink burst from a base station, the downlink burst including a portion modulated with a modulation technique, the portion addressed to one of a plurality of wireless nodes other than the apparatus; and
a processor module coupled to the modem and configured to measure a signal-to-noise ratio (SNR) measurement corresponding to the portion and determine, based on the SNR measurement, whether to change a current preferred modulation technique for receiving future downlink transmissions from the base station.

12. The apparatus of claim 11, wherein the modulation technique that modulates the portion of the downlink burst is selected from a group consisting of: quadrature amplitude modulation ("QAM")-16, QAM-64, and quadrature phase shift keying ("QPSK") modulation.

13. The apparatus of claim 11, wherein the portion is a first portion, the modulation technique that modulates the first portion is a first modulation technique, the downlink burst further includes a second portion modulated with a second modulation technique, and the first portion comprises a control header of the downlink burst.

14. The apparatus of claim 13, wherein the second portion is addressed to one of the plurality of wireless nodes other than the apparatus.

15. The apparatus of claim 13, wherein the first modulation technique is more robust than the second modulation technique.

16. The apparatus of claim 11, wherein the portion is a first portion, and the downlink burst includes a second portion modulated with a second modulation technique.

17. The apparatus of claim 16, wherein the downlink burst includes no portion addressed to the apparatus.

18. The apparatus of claim 11, wherein the processor module is further configured to compare the SNR measurement to a SNR range associated with the current preferred modulation technique, the SNR range including a bottom threshold and a top threshold, the processor module is configured to change the current preferred modulation technique to a more robust modulation technique if the SNR measurement is lower than the bottom threshold and the processor module is configured to change the current preferred modulation technique to a less robust modulation technique if the SNR measurement is higher than the top threshold.

19. The apparatus of claim 11, wherein the portion is one of two portions of the downlink burst, each portion modulated with one of a plurality of available modulation techniques, the SNR measurement is one of two SNR measurements measured by the apparatus corresponding to the two portions, respectively, and the processor module is further configured to select, from the two SNR measurements, the SNR measurement to be used to determine whether to change the current preferred modulation technique.

20. The apparatus of claim 19, wherein the processor module is configured to identify whether one of the two SNR measurements is a preferred SNR measurement corresponding to a portion modulated with the current preferred modulation technique and to select the preferred SNR measurement if so identified.

21. A method, comprising:
receiving, by a wireless node from a base station, a downlink burst including a portion modulated with a modulation technique, the portion addressed to one of a plurality of wireless nodes other than the wireless node;
measuring, by the wireless node, a signal-to-noise ratio (SNR) measurement of the portion; and
using the SNR measurement, by the wireless node, to determine whether to change a current preferred modulation technique for receiving future transmissions from the base station.

22. The method of claim 21, wherein the portion is a first portion, the modulation technique that modulates the first portion is a first modulation technique, the downlink burst further includes a second portion modulated with a second modulation technique, and the first portion comprises a control header of the downlink burst.

23. The method of claim 22, wherein the second portion is addressed to one of the plurality of wireless nodes other than the wireless node.

24. The method of claim 22, wherein the first modulation technique is more robust than the second modulation technique.

25. The method of claim 21, wherein the downlink burst includes no portion addressed to the wireless node.

26. The method of claim 21, wherein the using comprises comparing the SNR measurement to a SNR range associated with the current preferred modulation technique, the SNR range including a bottom threshold and a top threshold, and the method further comprises changing the current preferred modulation technique to a more robust modulation technique if the SNR measurement is lower than the bottom threshold and the method further comprises changing the current preferred modulation technique to a less robust modulation technique if the SNR measurement is higher than the top threshold.

27. The method of claim 21, wherein the portion is one of two portions of the downlink burst, each portion modulated by the base station with one of a plurality of available modulation techniques, and wherein the measuring of the method comprises measuring two SNR measurements corresponding to the two portions, respectively, and the method further includes selecting, from the two SNR measurements, the SNR measurement to be used for determining whether to change the current preferred modulation technique.

28. The method of claim 27, wherein the selecting of the SNR measurement to be used for determining whether to change the current preferred modulation technique includes identifying whether one of the two SNR measurements is a preferred SNR measurement corresponding to a portion modulated with the current preferred modulation technique, and, if so, selecting the preferred SNR measurement.

* * * * *

UNITED STATES PATENT AND TRADEMARK OFFICE
CERTIFICATE OF CORRECTION

PATENT NO.       : 7,577,100 B2
APPLICATION NO.  : 10/207661
DATED            : August 18, 2009
INVENTOR(S)      : Pollmann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1669 days.

Signed and Sealed this

Seventh Day of September, 2010

David J. Kappos
*Director of the United States Patent and Trademark Office*